F. Beard,
Bee Hive
No. 9,426 X.
Patented Feb. 25. 1836.
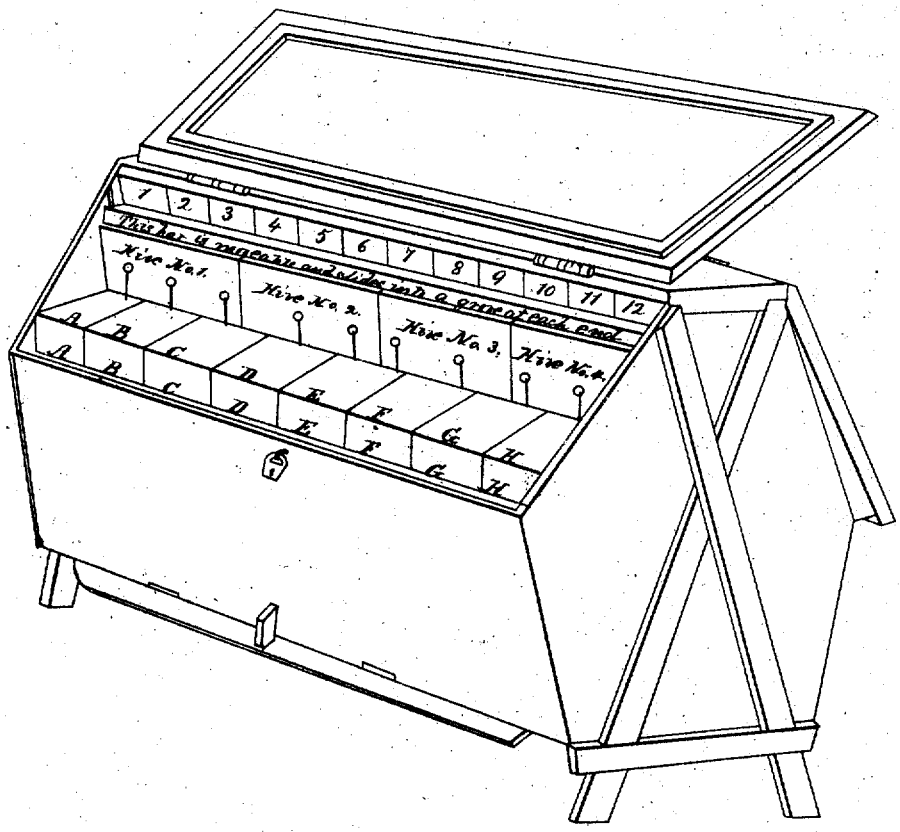
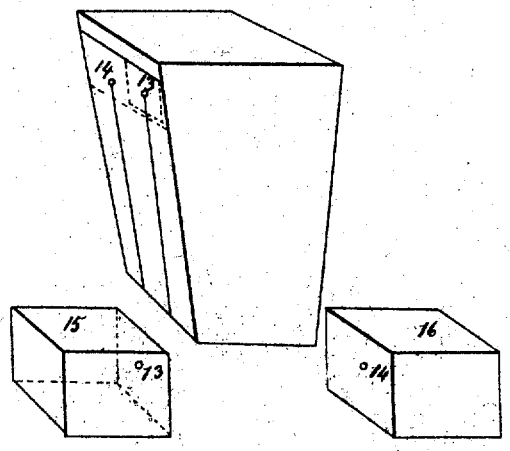

9426X [illegible] 25 1836

Ebenezer Beard, New Sharron Maine.

Letters Patent.

The Schedule referred to in these Letters Patent, and making part of the same, containing a description in the words of the said Ebenezer Beard, himself of his improvement in Bee Hives and Houses.

Be it known that I Ebenezer Beard, of New Sharron in the County of Kennebeck, and State of Maine, have invented constructed made and applied to use a new and useful improvement in Bee Hives and Bee Houses called "Beards Improved Bee House" and that the following is a true and just description and specification thereof. To wit;
The Houses may be made of various sizes, according to the number of swarms that inhabit them. A Bee House for four swarms of common size should be thirty nine and a half inches in length, the width on the bottom twenty three inches and from the bottom upwards fifteen inches, it widens to twenty nine inches. From the fifteen inches to the top is fourteen inches, making the whole twenty nine inches. Across the top is eleven inches, and from the top downwards on both sides, it is sloping so as to shed off the water. This sloping part or roof is hung on hinges at the top, so as to put four small hives with bees in them, into the large house, and also small boxes for the bees to make honey in, on the top of the house a cap is put to shed off the water from the joints that are made by the covers or lids. The Bee House stands on four legs made fast to it by nailing at each end. The bottom has one board ten inches wide, which runs from end to end, and to this bottom board there are on each side two small bottom boards hung by hinges, that should be let down in in hot weather to give the bees more room to enter the hives
in the time of making honey and also to give them a fresh
circulation of air and thereby facilitate them in their labour
These bottom boards are to be put up in the fall as soon as the
flowers disappear, so as to protect them from being robbed by
their neighbours and kept so until flowers appear again.
The above is a description of a bee house for four swarms,
but they may be made to suit three or two swarms in pro=
portion to the bees that inhabit them: There are put into
the centre on the middle bottom board, four hives with bees
in them. These hives are made as follows, one of them
side boards are whole, the other three are made with open=
ings, and the top is made with openings, either of long or
cracks running across the hive, and up and down or with
round or square holes in the hives and boxes. these [illegible]
openings or holes are to admit the bees into the boxes and
from one hive to the other; Glass globes or tumblers may
be put in, instead of boxes. The above described four
hives are of equal sizes. They are fifteen inches across
the top by nine and three quarters inches. In height seventeen
and three eights inches. The dimensions of the bottom are
nine and three quarters inches by eight and an half inches
On the sides of these hives are placed small boxes, three tiers
deep. but in some houses they are made only one or two or
tiers deep. The above have three tiers on each side of the
four hives. There are twenty four boxes on the top. in the
whole there are seventy two boxes, but they are sometimes
made with less. There is one swarm of bees put into each
of the above described hives during the time of swarm=
ing. and the hives are put into the large house. The open=
ings on the sides of the hives, are opened and the bees
permitted to amalgamate together, and thereby make
but two families in the large house. By admitting two
swarms

9426 X swarms together they make more honey and winter better.
By having two families made of four swarms, in the same
small house, their united heat causes a more even tem-
-perature there being only a half inch partition between
them. The frost affecting each end first causes the
bees to draw towards the warmer part of the hive, which
brings into the centre of the house on each side of the
partition, and thereby they do not suffer by the frost
in the winter. The following is a description of the boxes
in the bee house, to wit; Forty eight are four and seven
eights inches by six and a half and five inches deep.
Twenty four are made six and an half by three and a
quarter, and five deep. The comb of the hives (in which
the bees are put into the house) will become old
and unhealthy in seven or eight years and by having
two hives in one family, one can be taken out and one
empty one put in room of the full one, if the bees
should fill the empty one the first season, the next
season the other can be removed. The other end of the
house can be managed in the same way. Then the bee
house is as good as when the bees were first put into it.
This house is calculated to preserve the bees for a cen-
tury it being so constructed that the whole of the comb
in the house can be changed, and the bees make new
in room of the old. The hives should be changed the first
of July. What I claim as original and of my own inven-
tion is the manner of constructing and arranging the
hives and boxes within the house, and the manner in
which the bees communicate therewith.

Witnesses October 16th. 1835.
Wm. [illegible] Johnson
Henry W. Fuller Jr. Ebenezer Beard
1041 [illegible]

Exd
M.G.C

Drawing